(12) United States Patent
Grip

(10) Patent No.: US 8,500,060 B2
(45) Date of Patent: Aug. 6, 2013

(54) AIRCRAFT WITH A PRESSURIZED VESSEL

(75) Inventor: Robert Erik Grip, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 814 days.

(21) Appl. No.: 12/368,559

(22) Filed: Feb. 10, 2009

(65) Prior Publication Data

US 2010/0200689 A1 Aug. 12, 2010

(51) Int. Cl.
*B64C 37/00* (2006.01)
*B64C 35/00* (2006.01)

(52) U.S. Cl.
USPC .............. 244/2; 244/50; 244/63; 244/106

(58) Field of Classification Search
USPC .............. 244/2, 5, 13, 50, 106, 135 R, 63
See application file for complete search history.

(56) References Cited

U.S. PATENT DOCUMENTS

| | | | | |
|---|---|---|---|---|
| 2,399,461 A | * | 4/1946 | Brown | 244/30 |
| 2,720,367 A | * | 10/1955 | Doolittle | 244/1 R |
| 3,193,214 A | * | 7/1965 | Hollingsworth | 244/12.2 |
| 3,302,602 A | * | 2/1967 | Korganoff | 114/313 |
| 3,572,611 A | * | 3/1971 | Oulton | 244/2 |
| 3,623,444 A | | 11/1971 | Lang | |
| 3,698,668 A | | 10/1972 | Cole et al. | |
| D230,893 S | * | 3/1974 | Arruda | D12/308 |
| 3,815,773 A | | 6/1974 | Duvall et al. | |
| 3,848,558 A | | 11/1974 | Henry | |
| 3,897,743 A | * | 8/1975 | Schoonman | 114/321 |
| 3,937,208 A | | 2/1976 | Katz et al. | |
| 3,994,452 A | | 11/1976 | Cole | |
| 4,012,016 A | * | 3/1977 | Davenport | 244/97 |
| 4,053,124 A | | 10/1977 | Cole | |
| 4,069,811 A | | 1/1978 | Tabor | |
| 4,165,846 A | * | 8/1979 | Groeger | 244/2 |
| 4,200,253 A | | 4/1980 | Rowarth | |
| 4,247,066 A | | 1/1981 | Frost et al. | |
| 4,252,287 A | | 2/1981 | Zimmer | |
| 4,351,502 A | | 9/1982 | Statkus | |
| 4,429,844 A | | 2/1984 | Brown et al. | |
| 4,475,702 A | | 10/1984 | Cole | |

(Continued)

FOREIGN PATENT DOCUMENTS

| | | |
|---|---|---|
| EP | 1205383 | 5/2002 |
| EP | 2090848 | 8/2009 |

(Continued)

OTHER PUBLICATIONS

Marks, Paul, From sea to sky: Submarines that fly, http://www.newscientist.com/article/mg20727671.000-from-sea-to-sky-submarines-thatfly.com, p. 1-4.*

(Continued)

*Primary Examiner* — Joshua J Michener
*Assistant Examiner* — Elizabeth A Plummer
(74) *Attorney, Agent, or Firm* — Yee & Associates, P.C.

(57) ABSTRACT

An aircraft comprising a fuselage, a vessel associated with the fuselage, a propulsion system associated with the fuselage, and a lift system. The vessel is capable of storing a pressurized gas compressed to a density that allows the aircraft to operate under water. The lift system is capable of providing the aircraft lift to fly in air.

18 Claims, 3 Drawing Sheets

U.S. PATENT DOCUMENTS

| | | | | |
|---|---|---|---|---|
| 4,553,722 | A | 11/1985 | Cole | |
| 4,650,140 | A | 3/1987 | Cole | |
| 4,706,913 | A | 11/1987 | Cole | |
| 5,237,952 | A * | 8/1993 | Rowe | 114/332 |
| 5,242,132 | A * | 9/1993 | Wukowitz | 244/106 |
| 5,373,800 | A * | 12/1994 | Steinberg | 114/282 |
| 5,415,365 | A * | 5/1995 | Ratliff | 244/101 |
| 5,653,404 | A | 8/1997 | Ploshkin | |
| 5,788,184 | A * | 8/1998 | Eddy | 244/121 |
| 5,887,828 | A | 3/1999 | Appa | |
| 6,010,098 | A | 1/2000 | Campanile et al. | |
| 6,202,442 | B1 * | 3/2001 | Brugerolle | 62/649 |
| 6,558,823 | B1 * | 5/2003 | Pinney | 429/428 |
| 6,559,370 | B1 * | 5/2003 | Barker | 114/20.2 |
| 6,565,037 | B1 * | 5/2003 | Tonkovich | 244/5 |
| 6,644,599 | B2 | 11/2003 | Perez | |
| 6,655,313 | B1 | 12/2003 | Woodall et al. | |
| 6,796,534 | B2 | 9/2004 | Beyer et al. | |
| 6,848,647 | B2 * | 2/2005 | Albrecht | 244/2 |
| 6,860,449 | B1 * | 3/2005 | Chen | 244/12.1 |
| 6,925,760 | B2 | 8/2005 | Suprina | |
| 6,959,993 | B2 | 11/2005 | Gross et al. | |
| 7,097,136 | B2 * | 8/2006 | Ruszkowski, Jr. | 244/105 |
| 7,131,389 | B1 * | 11/2006 | Hawkes | 114/330 |
| 7,156,342 | B2 * | 1/2007 | Heaven et al. | 244/30 |
| 7,252,264 | B2 * | 8/2007 | Nattinger | 244/2 |
| 7,264,206 | B2 | 9/2007 | Wheaton et al. | |
| 7,270,305 | B2 | 9/2007 | Rampton et al. | |
| 7,306,187 | B2 * | 12/2007 | Lavan | 244/123.11 |
| 7,320,851 | B2 | 1/2008 | Zhou et al. | |
| 7,322,547 | B2 | 1/2008 | Konings | |
| 7,338,018 | B2 | 3/2008 | Huynh et al. | |
| 7,487,936 | B2 * | 2/2009 | Heaven, Jr. | 244/30 |
| 7,530,533 | B2 | 5/2009 | Perez-Sanchez | |
| 7,699,270 | B2 | 4/2010 | Lonsinger et al. | |
| 7,797,889 | B2 | 9/2010 | McClintock et al. | |
| 7,858,875 | B2 | 12/2010 | Lu et al. | |
| 7,878,192 | B2 | 2/2011 | Larsen | |
| 7,900,402 | B2 | 3/2011 | Staten et al. | |
| 7,905,227 | B2 | 3/2011 | Luconi et al. | |
| 7,913,485 | B2 * | 3/2011 | Butler et al. | 60/221 |
| 7,918,421 | B2 | 4/2011 | Voglsinger et al. | |
| 7,938,358 | B2 * | 5/2011 | Dietrich et al. | 244/2 |
| 8,056,865 | B2 | 11/2011 | Grip | |
| 8,188,414 | B2 | 5/2012 | Linke | |
| 8,205,829 | B2 * | 6/2012 | Bossert et al. | 244/63 |
| 2003/0200703 | A1 | 10/2003 | Suprina | |
| 2005/0229924 | A1 | 10/2005 | Luconi et al. | |
| 2006/0049301 | A1 * | 3/2006 | Yam et al. | 244/5 |
| 2006/0054162 | A1 | 3/2006 | Romeo | |
| 2006/0157623 | A1 | 7/2006 | Voglsinger et al. | |
| 2007/0063099 | A1 * | 3/2007 | Holloman | 244/117 R |
| 2007/0152106 | A9 | 7/2007 | Perez-Sanchez | |
| 2008/0163864 | A1 | 7/2008 | Larson | |
| 2008/0230047 | A1 | 9/2008 | Shugar et al. | |
| 2010/0224734 | A1 | 9/2010 | Grip | |
| 2011/0001000 | A1 * | 1/2011 | Zhu | 244/12.1 |
| 2011/0017876 | A1 | 1/2011 | Manley et al. | |
| 2011/0155840 | A1 * | 6/2011 | Lind et al. | 244/13 |
| 2012/0056038 | A1 | 3/2012 | Grip | |
| 2012/0199115 | A1 | 8/2012 | Grip | |

FOREIGN PATENT DOCUMENTS

| | | |
|---|---|---|
| EP | 2136156 | 12/2009 |
| FR | 2610254 A1 * | 8/1988 |
| JP | 2003343048 | 12/2003 |
| WO | 0247976 | 6/2002 |
| WO | 2010063018 | 6/2010 |
| WO | 2010101699 | 9/2010 |

OTHER PUBLICATIONS

Pentagon plans flying submarine, Jul. 2010, http://uforesearchnetwork.proboards/com, p. 1-9.*

Chivers, Tom, Pentagon plans 'flying submarine', Jul. 5, 2010, http://www.telegraph.co.uk/science/7872645/Pentagon-plans-flying-submarine.html, p. 3-4.*

Manta fighter from "Sky Captain & The World o Tomorrow", http://www.fantastic-plastic.com/SkyCaptainMantaFighterCatalogpage.htm, p. 1-4.*

U.S. Appl. No. 12/398,951, filed Mar. 5, 2009, Grip.

PCT Search Report with Written Opinion dated Sep. 2, 2010 regarding international application No. PCT/US2010/023503, applicant The Boeing Company, 14 pages.

PCT Search Report with Written Opinion dated Apr. 18, 2012 regarding international application No. PCT/US2011/066246, applicant The Boeing Company, 9 pages.

Davis et al., "Development of the Variable Camber System for a Supercritical Wing", General Dynamics Fort Worth Division, Technical Report AFFDL-TR-76-65, Jul. 1976, 381 pages.

USPTO Notice of Allowance dated Sep. 19, 2011 for U.S. Appl. No. 12/398,951, 14 pages.

USPTO Office Action dated Aug. 17, 2012 regarding U.S. Appl. No. 13/021,646, 28 pages.

* cited by examiner

AIRCRAFT WITH A PRESSURIZED VESSEL

BACKGROUND INFORMATION

1. Field

The present disclosure relates generally to aircraft and, in particular, to a method and apparatus for an aircraft to operate in the air and under water.

2. Background

An aircraft is a vehicle that is capable of flying through the atmosphere. Aircraft may come in various forms. For example, an aircraft may be a fixed-wing aircraft, such as an airplane. An aircraft also may take the form of a rotary-wing aircraft, such as a helicopter. Aircraft are capable of travelling from an origination point to a destination point relatively quickly. Aircraft are suitable for many different types of missions. Aircraft, however, may be easily detected in many cases.

With respect to operations involving bodies of water, it may be desirable to avoid detection when travelling from an origination point to a destination point. With this type of situation, an under water vehicle, such as a submarine, may be desirable. A submarine, however, may take a longer amount of time to travel from an origination point to a destination point.

It may be desirable to perform operations in the air and under the water. For example, it may be desirable to travel by air until some distance before the destination. Traveling in the air may be desirable to increase the speed at which the vehicle may reach the destination. Travelling under the water for the remaining distance to the destination may be performed to avoid detection.

A vehicle that operates in both the air and under the water may be difficult to design and manufacture. For example, a submarine is heavy to allow the submarine to operate under water. In contrast, an aircraft is typically designed to be light to allow the aircraft to fly in the air. Current aircraft do not have a capability to provide neutral buoyancy with the structures used in aircraft. These two types of operations have opposing design constraints in terms of the structure and design needed for performing the different operations.

A single vehicle that is capable of performing operations in the air and under water may be difficult to manufacture and design because of the different considerations used in designing aircraft and submarines.

One solution may be to employ a two vehicle system that has two parts in which one vehicle is capable of flying and carrying a second submersible vehicle. This type of two-vehicle solution, however, may require the aircraft to remain on and/or near the surface of the water or leave the area, while the submersible vehicle performs a mission. Leaving the aircraft on the surface may be disadvantageous if the mission requires the participants to be undetected. Further, leaving the surface also may expend extra fuel and separate the two vehicles by distance, which may reduce readiness in case an emergency occurs.

Therefore, it would be advantageous to have a method and apparatus that takes into account one or more of the issues discussed above as well as possibly other issues.

SUMMARY

In one advantageous embodiment, an aircraft comprises a fuselage, a vessel associated with the fuselage, a propulsion system associated with the fuselage, and a lift system. The vessel is capable of storing a pressurized gas compressed to a density that allows the aircraft to operate under water. The lift system is capable of providing the aircraft lift to become airborne.

In another advantageous embodiment, a method is present for operating the aircraft. Pressurized gas is stored in a vessel for an aircraft. The pressurized gas is under a pressure such that the pressurized gas has a density such that the aircraft is capable of operating under water. The aircraft is operated with stored pressurized gas.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
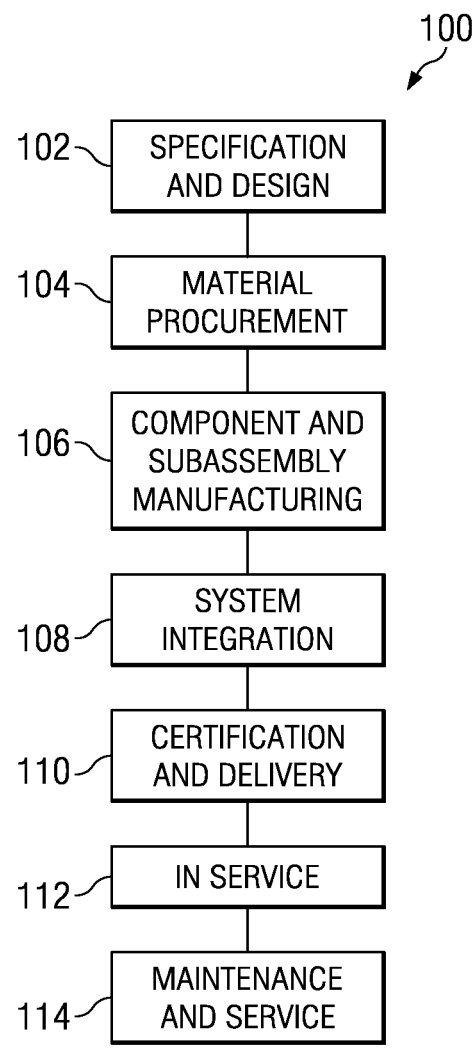
FIG. 1 is a diagram illustrating an aircraft manufacturing and service method in accordance with an advantageous embodiment.
Figure 2:
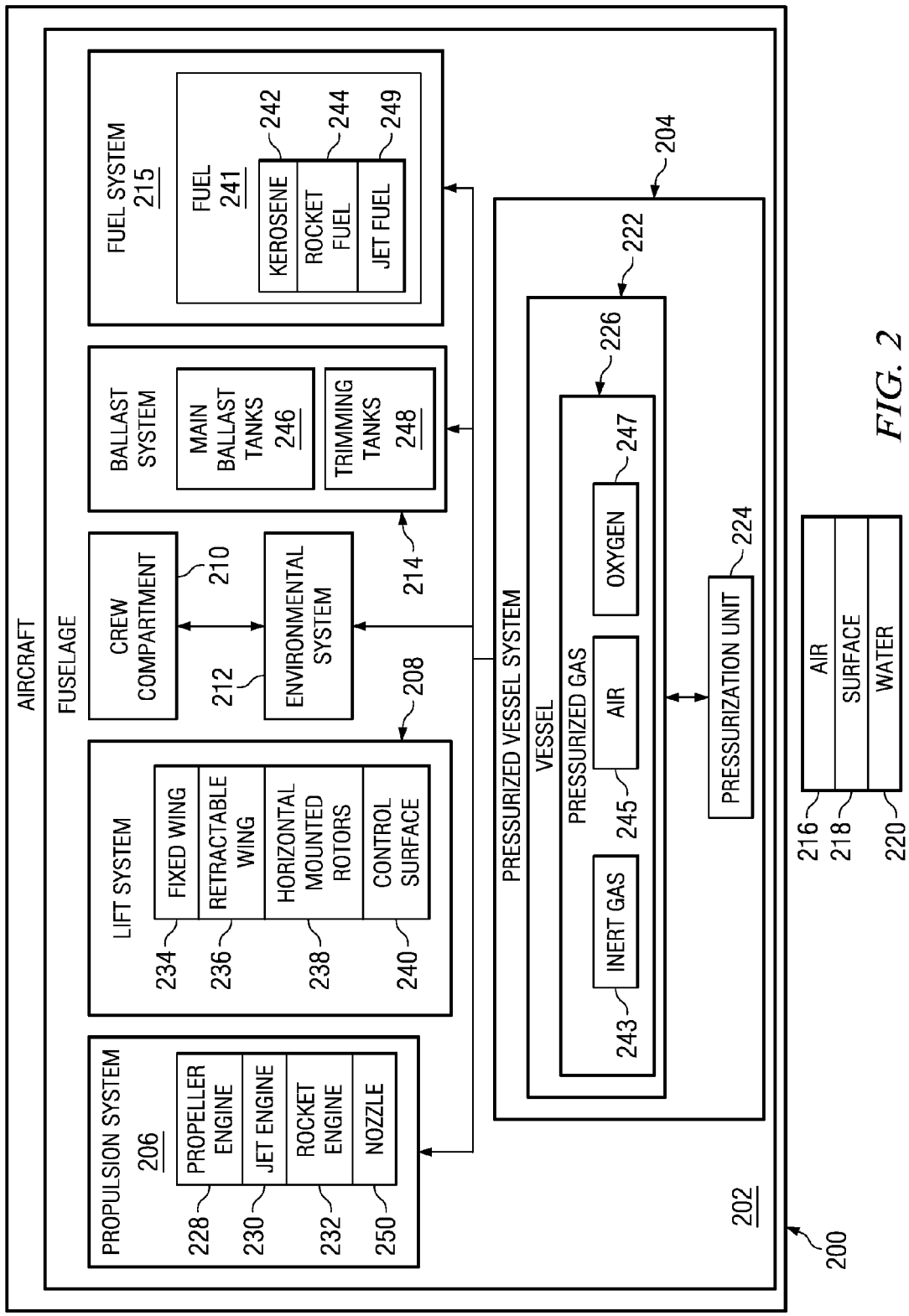
FIG. 2 is a block diagram of an aircraft in accordance with an advantageous embodiment.

Referring more particularly to the drawings, embodiments of the disclosure may be described in the context of the aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

The apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

The different advantageous embodiments recognize and take into account that a submersible aircraft needs to be light enough to fly in the air but heavy enough to be submerged under water. Therefore, the different advantageous embodiments provide a method and apparatus for an aircraft that may be submersible. The aircraft may comprise a fuselage, a vessel associated with the fuselage, a propulsion system attached to the fuselage, and a lift system.

The vessel is capable of storing pressurized gas that is compressed to a density that is approximately one gram per cubic centimeter. This type of density provides additional weight for the aircraft. The compressed gas may allow the aircraft to be heavy enough to become submerged under water. In the illustrative examples, the vessel is associated with the fuselage by being inside the fuselage or attached to the fuselage. When the vessel is attached to the fuselage, the vessel may be directly attached to the fuselage, inside another structure attached to the fuselage, attached to another structure attached to the fuselage, and/or some other type of association that allows the aircraft to become submerged under water. The association may be permanent or temporary.

With reference now to FIG. 2, a block diagram of an aircraft is depicted in accordance with an advantageous embodiment. In this example, aircraft 200 includes fuselage 202, pressurized vessel system 204, propulsion system 206, lift system 208, crew compartment 210, environmental system 212, ballast system 214, and fuel system 215. These, and other systems not shown, may provide aircraft 200 a capability to operate both in air 216, on surface 218 of water 220, and under water 220.

In these examples, pressurized vessel system 204 may be located inside of fuselage 202. Fuselage 202 is a structural component capable of holding various components as well as having components attached to it.

Pressurized vessel system 204 includes vessel 222 and pressurization unit 224. Vessel 222 is a structure capable of storing pressurized gas 226, which may be compressed to a density around one gram per cubic centimeter. This density is close to the density of water. In the different advantageous embodiments, pressurized gas 226 may be compressed to a number of different levels of pressure. For example, without limitation, pressurized gas 226 may be compressed from around 500 atmospheres to around 1,000 atmospheres. Of course, other levels of pressure may be used in other advantageous embodiments.

In the different advantageous embodiments, vessel 222 may be comprised of various materials. For example, vessel 222 may be comprised of any material capable of storing pressurized gas 226. For example, without limitation, vessel 222 may be made from steel, titanium, composite materials, polymers, and/or some other suitable material.

Pressurization unit 224 is capable of introducing gas into vessel 222 to form pressurized gas 226. Further, pressurization unit 224 also is capable of releasing pressurized gas 226 from vessel 222. Pressurization unit 224 may be implemented using a number of pumps and/or other suitable devices capable of generating pressurized gas 226. In some advantageous embodiments, pressurization unit 224 may only provide a capability to release pressurized gas rather than generate pressurized gas. With this type of implementation, gas may be introduced through pressurization unit 224 by some other pump external to aircraft 200.

In these examples, propulsion system 206 provides a capability to propel or move aircraft 200 in air 216, on surface 218, and/or under water 220. Propulsion system 206 may take various forms. For example, without limitation, propulsion system 206 may include at least one of propeller engine 228, jet engine 230, rocket engine 232, and/or some other suitable type of propulsion unit.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C. In other examples, "at least one of" may be, for example, without limitation, two of item A, one of item B, and ten of item C; four of item B and seven of item C; and other suitable combinations.

Lift system 208 may comprise a number of structures capable of providing lift for aircraft 200, while in air 216. A number, as used herein, with reference to items refers to one or more items. For example, a number of structures is one or more structures. Lift system 208 also may be used to guide aircraft 200 when on surface 218 of water 220 and/or under water 220. Lift system 208 may include, for example, at least one of fixed wing 234, retractable wing 236, rotors 238 with approximately vertical axes, control surface 240, and/or other suitable structures.

Fixed wing 234 may have a shape and size capable of allowing aircraft 200 to operate under water 220 as well as fly in air 216. For example, fixed wing 234 may have a wing similar to space shuttles. In other advantageous embodiments, aircraft 200 may have retractable wing 236.

Retractable wing 236 may be capable of allowing aircraft 200 to fly in air 216. When aircraft 200 is ready to operate under water 220, aircraft 200 may land on surface 218 of water 220 and retract and/or stow retractable wing 236 before moving under water 220. Horizontal mounted rotors 238 may be rotors similar to those used by aircraft such as, for example, helicopters.

Horizontal mounted rotors 238 also may be retracted and/or stowed before aircraft 200 moves under water 220. Propulsion system 206 may be connected to horizontally mounted rotors 238 to turn horizontally mounted rotors 238 to provide lift for aircraft 200.

Control surface 240 may provide aircraft 200 a capability to control the movement of aircraft 200 when aircraft 200 is in air 216, on surface 218 of water 220, and/or under water 220.

Crew compartment 210 may be a location in which human operators may be located to control aircraft 200 when aircraft 200 is a manned aircraft. Of course, in some advantageous embodiments, aircraft 200 may be an unmanned aircraft.

Environmental system 212 may provide an appropriate environment for passengers within crew compartment 210 while aircraft 200 is in air 216 and/or under water 220. Environmental system 212 may provide a capability to control the temperature within crew compartment 210 as well as provide fresh air and/or oxygen to crew compartment 210. Environmental system 212 can also provide temperature control for avionics systems and other equipment for either a manned or unmanned vehicle.

Fuel system 215 contains fuel 241 to operate propulsion system 206. Further, pressurized vessel system 204 may be connected to fuel system 215. When pressurized vessel system 204 contains pressurized gas 226 in the form of inert gas 243, pressurized gas 226 may be sent into fuel system 215 to provide an inert atmosphere within fuel system 215.

In some advantageous embodiments, pressurized vessel system 204 may be connected to environmental system 212. In this illustrative example, pressurization unit 224 may provide a connection for vessel 222 to environmental system 212. This type of configuration may be present when pressurized gas 226 takes the form of air 245 and/or oxygen 247. With this type of configuration, pressurized gas 226 may provide air 245 and/or oxygen 247 for crew compartment 210 through environmental system 212. As a result, aircraft 200 may stay submerged for longer periods of time.

Further, vessel 222 in pressurized vessel system 204 also may be connected to propulsion system 206 when pressurized gas 226 takes the form of air 245 and/or oxygen 247. With this type of configuration, air 245 may be provided to propulsion system 206 to operate aircraft 200 under water 220. As a result, access to air 216 on surface 218 of water 220 may be unnecessary. As a result, a snorkel to provide oxygen for propulsion system 206 and/or crew compartment 210 is unnecessary.

Further, with this type of configuration, vessel 222 may provide pressurized gas 226 for use by propulsion system 206 to provide a capability to move aircraft 200 from under water 220 into air 216.

For example, without limitation, propulsion system 206 may include rocket engine 232. Pressurized gas 226 in the form of oxygen 247 may be mixed with kerosene 242 in fuel system 215 to create rocket fuel 244 for rocket engine 232. Kerosene 242 may normally be used for other types of movement of aircraft 200. For example, kerosene 242 may be used by propulsion system 206 when aircraft 200 is located under water 220. Kerosene 242 also may be used to operate propeller engine 228. Fuel 241 also may take the form of jet fuel 249. Of course, fuel 241 may take other forms, depending on the particular implementation.

Ballast system 214 may take on water to alter the buoyancy of aircraft 200 and allow aircraft 200 to dive and/or move under water 220. Ballast system 214 may include various types of ballast tanks. For example, ballast system 214 may include main ballast tanks 246 for diving and surfacing as well as trimming tanks 248, which may be used to adjust the attitude of aircraft 200 when aircraft 200 is located on surface 218 of water 220 and/or under water 220.

In the different advantageous embodiments, pressurized vessel system 204 also may be connected to ballast system 214. Pressurized vessel system 204 may send pressurized gas 226 into ballast system 214 to move water out of ballast system 214 when aircraft 200 is ready to operate on surface 218 of water 220 or take off into air 216.

In some advantageous embodiments, pressurized gas 226 may be sent into propulsion system 206 from vessel 222 to directly lift aircraft 200 from under water 220 into air 216 for takeoff. Pressurized gas 226 may be sent through nozzle 250 in propulsion system 206.

Further, pressurized gas 226 from vessel 222 also may be used to provide pressurization within the different compartments inside fuselage 202, while aircraft 200 is located under water 220. In this manner, pressurization may be provided to reduce and/or prevent the intrusion of water 220 into fuselage 202 due to any leaks and/or imperfections in the pressure seals.

The illustration of aircraft 200 in FIG. 2 is not meant to imply physical or architectural limitations to the manner in which different advantageous embodiments may be implemented. Other components in addition to, or in place of, the ones illustrated may be used in different advantageous embodiments. Further, in some advantageous embodiments, some of the components illustrated for aircraft 200 may be unnecessary.

For example, a number of vessels, in addition to vessel 222, may be used in some advantageous embodiments. These vessels may contain different types of pressurized gas 226. For example, pressurized gas 226 may be inert gas 243 in one vessel and oxygen 247 in another vessel. As another example, in some advantageous embodiments, aircraft 200 may be an unmanned aircraft.

With that type of implementation, crew compartment 210 and environmental system 212 may be unnecessary. In yet other advantageous embodiments, a compartment or component, such as a weapons system, a cargo area, or some other suitable component, may be used in aircraft 200.

Figure 3:
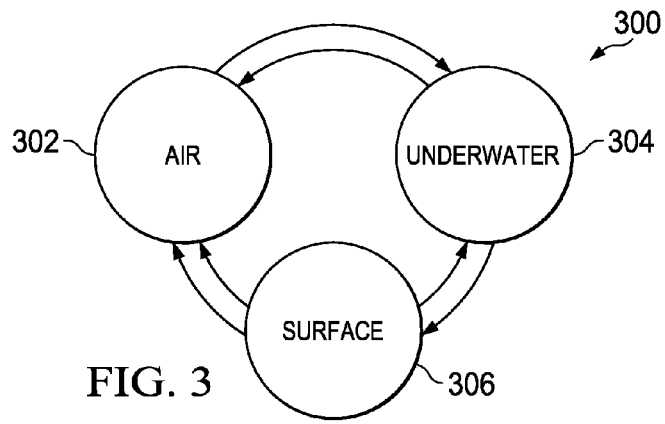
FIG. 3 is a diagram illustrating a number of modes of operation for an aircraft in accordance with an advantageous embodiment.

With reference now to FIG. 3, a diagram illustrating a number of modes of operation for an aircraft is depicted in accordance with an advantageous embodiment. In this example, diagram 300 illustrates a number of different modes of operation for an aircraft such as, for example, aircraft 200 in FIG. 2.

The different modes include air mode 302, underwater mode 304, and surface mode 306. An aircraft may operate in air mode 302 and transition to operating in underwater mode 304 through the use of a pressurized vessel system such as, for example, pressurized vessel system 204 in FIG. 2. This transition directly from air mode 302 to underwater mode 304 may occur if the aircraft is capable of diving into the water from the air. Pressurized vessel system 204 may provide the needed weight for an aircraft to operate in underwater mode 304. In some advantageous embodiments, the aircraft may transition from air mode 302 to surface mode 306 to move on the surface of the water. Thereafter, the aircraft may transition to underwater mode 304.

The aircraft may land on the surface and operate in surface mode 306 to prepare for operating in underwater mode 304. For example, without limitation, the aircraft may retract a retractable wing or horizontally mounted rotors to allow for movement under water. In yet other advantageous embodiments, the aircraft may land on the water and operate in surface mode 306 and allow water to enter a ballast system to allow the aircraft to submerge and operate in underwater mode 304.

When in underwater mode 304, the aircraft may launch into air mode 302 directly without operating in surface mode 306. For example, the aircraft may use pressurized gas from the pressurized vessel system to propel the aircraft from underwater mode 304 into the air to enter air mode 302.

In yet other advantageous embodiments, if the pressurized gas in the pressure vessel system takes the form of oxygen, the oxygen may be used along with other fuel to generate fuel for a rocket system in the aircraft to propel the aircraft from under water into the air. In yet other advantageous embodiments, the aircraft may surface and enter surface mode 306 to extend components, such as a retractable wing and/or horizontally mounted rotors to take off to operate in air mode 302.

In the different advantageous embodiments, the aircraft may repeatedly cycle through the different modes as long as sufficient pressurized gas is present to allow the aircraft to submerge and enter underwater mode 304. As a result, if pressurized gas is used to launch the vehicle into air mode 302 or help the vehicle to surface into surface mode 306, at some point repeating these modes may result in insufficient amounts of pressurized gas to allow the aircraft to enter underwater mode 304. Of course, additional pressurized gas may be introduced into the pressure vessel system to allow for a continued operation in all of the different modes of operation in this example.

In other advantageous embodiments, pressurized vessel system 204 may be associated with fuselage 202 in FIG. 2 in other ways. For example, pressurized vessel system 204 may be associated with fuselage 202 by being installed in wings for aircraft 200, behind a fairing for aircraft 200, and/or in any other suitable locations on or in the aircraft in addition to being located in fuselage 202.

Figure 4:
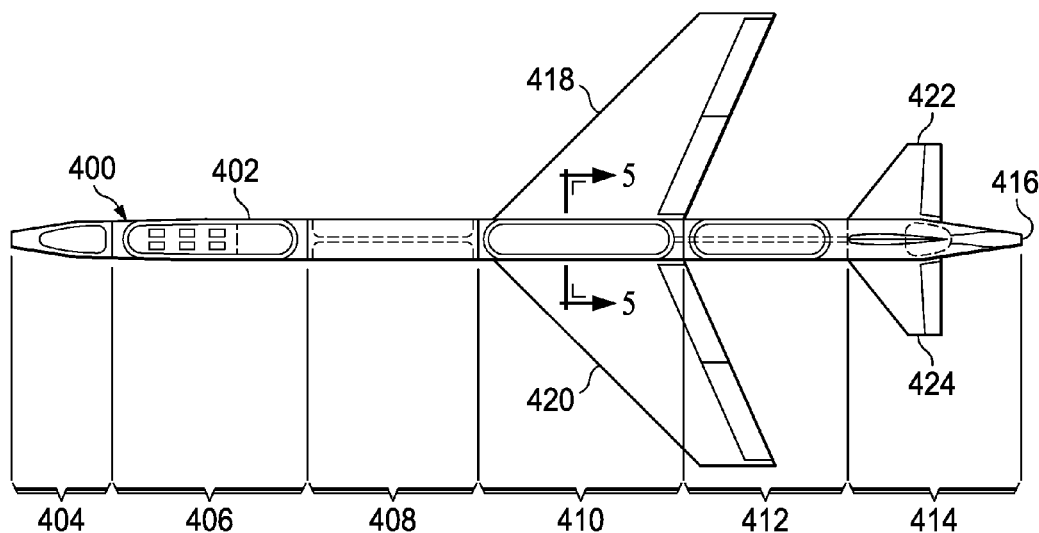
FIG. 4 is a diagram of an aircraft in accordance with an advantageous embodiment.

With reference now to FIG. 4, a diagram of an aircraft is depicted in accordance with an advantageous embodiment. In this example, aircraft 400 is an example of one implementation for aircraft 200 in FIG. 2. Aircraft 400 is a submersible aircraft in these examples. In other words, aircraft 400 may operate both in air and under water.

In this illustrative example, aircraft 400 is seen from a top view. Aircraft 400 has a number of different sections within fuselage 402. Aircraft 400 includes fuel section 404, crew section 406, ballast section 408, vessel section 410, fuel and ballast section 412, and propulsion section 414. Aircraft 400 also has orifice 416, wing 418, wing 420, stabilizer 422, and stabilizer 424.

Orifice 416 may be an outlet for generating thrust by an engine in propulsion section 414, while aircraft 400 is in the air. Further, orifice 416 also may be used to propel aircraft 400, while aircraft 400 is under water.

In addition, in this illustrative example, orifice 416 may have a diameter, which may be capable of providing aircraft 400 sufficient force to take off from the water. This take off may be from the surface of the water and/or from under the surface of the water.

For example, if vessel section 410 contains compressed oxygen, 10,000 psi of oxygen with a 10 inch diameter for orifice 416 may be capable of providing sufficient force for aircraft 400 to take off in the water. Force may be calculated as follows for these parameters:

$$F = \rho A = \rho \pi R^2 = (10,000)\pi(5.0)^2 = 785,400 \text{ lb}$$

F is force, $\rho$ is pressure, A is area of a cross section of the vessel, and R is the radius of orifice 416.

As an alternative, the oxygen in vessel section 410 may be used as an oxidizer for propulsion system 414 when propulsion system 414 functions as a rocket engine to provide boost. For example, the oxygen in vessel section 410 may be mixed with fuel such as, for example, without limitation, kerosene, to form rocket fuel for a rocket engine in propulsion section 414.

In this illustrative example, the different sections in aircraft 400 may have different densities relative to the density of water. The percent of water weight, in these examples, may equal the weight of the water to allow aircraft 400 to operate under water.

For example, without limitation, fuel section 404 may have a specific density relative to water that is approximately equal to water. The specific density may include fluids, structures, and other components within a section, such as fuel section 404. Crew section 406 may have a density that may be much less than water. A density that is much less than water may be, for example, without limitation, a density that is around 50 percent to around 90 percent less than the density of water. Ballast section 408 may have a density approximately equal to water.

Vessel section 410 may have a density that may be much greater than water. A density that may be much greater than water may be, for example, without limitation, a density of around 20 percent to around 50 percent more than the density of water. Fuel and ballast section 412 may have a density approximately equal to water. Propulsion section 414 also may have a density that is around equal to water.

In these illustrative examples, aircraft 400 may have an overall density that may be around equal to the density of water that may be displaced by aircraft 400 when aircraft 400 is under water.

Figure 5:
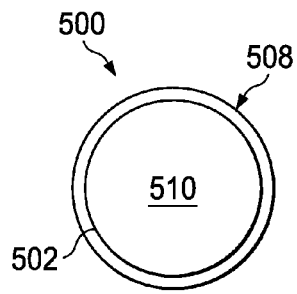
FIG. 5 is a diagram illustrating a cross section of a vessel for storing pressurized gas in accordance with an advantageous embodiment.

With reference now to FIG. 5, a diagram illustrating a cross section of a vessel for storing pressurized gas is depicted in accordance with an advantageous embodiment. In this example, section 500 of pressurized vessel 502 is shown taken along lines 6-6 in vessel section 410 from FIG. 4.

In this example, pressurized vessel 502 has skin 508 with interior 510. In this illustrative example, skin 508 is in tension with respect to pressurized gas that may be located in interior 510. Skin 508 may have a force applied to it of F=around 100,000 psi. This weight may be around 1,563 pounds per foot.

The pressure around the circumference of skin 508 may be described using hoop stress with an internal pressure. The hoop stress in a cylinder with an internal pressure is given by the following equation: $\sigma = \rho R/t$, where $\sigma$=the hoop stress in the skin in psi, $\rho$ is the internal pressure in psi, R is the radius of the cylinder in inches, and t is the thickness of the skin in inches.

Pressurized gas within interior 510 may be pressurized to around a number of different levels, depending on the particular implementation. In the different advantageous embodiments, the pressurized gas within interior 510 may be pressurized such that the density is about one gram per cubic centimeter.

In these examples, the pressurization of gas within interior 510 may be from around 500 atmospheres to around 1,000 atmospheres. Around 680 atmospheres is equal to around 10,000 psi. This gives a value for p as around 52 pounds per cubic foot with a weight of around 1,327 pounds per foot.

In this illustrative example, skin 508 may be comprised of various materials that may be capable of withstanding the desired pressures. For example, skin 508 may be comprised of materials used in aircraft structures. These materials may include, for example, without limitation, a carbon composite, aluminum, titanium, steel, and/or any other suitable material.

For example, with a cylinder radius of around 36 inches, an internal pressure of around 10,000 pounds per square inch and a hoop stress of 100,000 pounds per square inch may result in a thickness for skin 508 that is around 3.6 inches.

In these illustrative examples, the pressure of water may effectively subtract from the internal pressure. This type of situation may provide a capability for pressurized vessel 502 to dive to deeper depths than may be currently present. For example, pressurized vessel 502 may dive to a depth of around 20,000 feet below the surface of the ocean without skin 508 experiencing compressive stresses. The ballast section may allow the pressure to be equal to the pressure at the depth at which the vehicle is located. The other sections may use a design for submarines. In other words, pressurized vessel 502 may have a design and/or weight that is insensitive to diving depth.

The illustration of aircraft 400 in FIG. 4 and the cross section of vessel section 410 in FIG. 4 are provided as examples of one manner in which these components may be implemented. This depicted example is not meant to limit the manner in which other advantageous embodiments may be implemented. For example, fuselage 402 in FIG. 4 may have different shapes and sizes, depending on the particular implementation.

Also, the different sections shown for aircraft 400 may be placed in other arrangements other than the one shown. For example, in some advantageous embodiments, crew section 406 may be the first section in aircraft 400 in FIG. 4. In other advantageous embodiments, aircraft 400 in FIG. 4 may have additional vessel sections.

Further, although the cross section of the vessel is shown as a circle or cylinder, the shape of the vessel may take other forms, depending on the particular implementation. For example, the vessel section may have a cylindrical vessel within that portion of the fuselage. Other examples may be a cone or other suitable shape.

Figure 6:
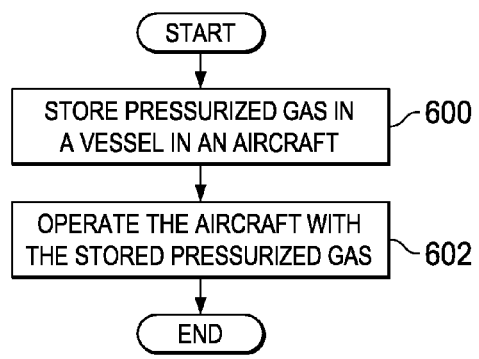
FIG. 6 is a flowchart of a process for operating an aircraft in accordance with an advantageous embodiment.

With reference now to FIG. 6, a flowchart of a process for operating an aircraft is depicted in accordance with an advantageous embodiment. The process illustrated in FIG. 6 may be implemented using an aircraft such as, for example, aircraft 200 in FIG. 2.

The process begins by storing pressurized gas in a vessel in the aircraft (operation 600). The pressurized gas may be introduced using a pressurization unit. The pressurized gas is under a pressure such that the gas has a density to allow the aircraft to operate under water. In other words, the density may allow the aircraft to become submerged or remain under water without the aircraft actively generating a force to remain under the surface of the water. The process then operates the aircraft with the stored pressurized gas (operation 602), with the process terminating thereafter.

In operating the aircraft in operation 602, the aircraft may be operated in the air and/or under the water with the stored pressurized gas. Further, in operating the aircraft, pressurized gas may be sent from the vessel to an orifice in the fuselage of the aircraft to propel the aircraft into air from under water. Further, the pressurized gas may take the form of nitrogen in which the nitrogen is sent from the vessel to a fuel system in the aircraft to create an inner environment for the fuel system as part of the step of operating the aircraft in operation 602.

Also, operation 602 may involve sending oxygen from the vessel to a crew compartment and a propulsion system in the vehicle when the pressurized gas takes the form of oxygen and/or air. Also, in operation 602, pressurized gas may be sent from the vessel to a ballast system in the aircraft to displace water in the ballast system. Further, the operating of the aircraft with the stored pressurized gas also may involve operating the aircraft on a surface of water.

Thus, the different advantageous embodiments provide a method and apparatus for an aircraft that is capable of operating both in the air and under water. The different advantageous embodiments may provide a vessel for an aircraft that is capable of storing a pressurized gas. This pressurized gas may be compressed to a density that allows the aircraft to operate under the water.

In this manner, the use of a pressurized vessel storing pressurized gas may allow an aircraft to have a weight that allows the aircraft to remain submerged under the water without actively generating force to remain under the water. Further, the compressed gas also may be released and/or used for other purposes. Additionally, an aircraft may perform multiple roles in a mission that may normally require two vehicles.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An aircraft comprising:
   a fuselage of the aircraft;
   a vessel within the fuselage, wherein the vessel stores a pressurized gas compressed to a first density that allows the aircraft to become submerged under a body of water and to exit the body of water in response to the pressurized gas exiting an orifice of a nozzle in the fuselage, wherein the first density is around one gram per cubic centimeter, and wherein the vessel is pressurized to a first pressure from around 600 atmospheres to around 700 atmospheres, wherein the orifice of the nozzle has a diameter to provide a force created by a release of the pressurized gas through the orifice of the nozzle; and wherein different sections of the aircraft are capable of having different densities relative to a second density of a water; and
   a lift system to provide lift to the aircraft in an air so that the aircraft takes off into the air from under the body of water in response to the force.

2. The aircraft of claim 1 further comprising:
   an environmental system, wherein the vessel is connected to the environmental system.

3. The aircraft of claim 2, wherein the pressurized gas is selected from one of an inert gas, air, nitrogen, and oxygen.

4. The aircraft of claim 1 further comprising:
   a crew compartment in the fuselage having a third density less than the second density.

5. The aircraft of claim 1 further comprising:
   a fuel system in the fuselage having substantially the second density.

6. The aircraft of claim 1 further comprising:
   a ballast system in the fuselage allowing the first pressure of the vessel to equal a second pressure at a depth at which the aircraft is located.

7. The aircraft of claim 1 further comprising:
   a crew compartment in the fuselage having a third density less than the second density;
   a ballast system in the fuselage capable of allowing the first pressure of the vessel to equal a second pressure at a depth at which the aircraft is located; and
   a fuel system in the fuselage having substantially the second density.

8. The aircraft of claim 7, wherein the vessel, a propulsion system, the ballast system, the crew compartment, and the fuel system in the fuselage are such that the aircraft is neutrally buoyant while the aircraft is submerged under the body of water.

9. The aircraft of claim 1, wherein the lift system comprises:
   a fixed wing system connected to the fuselage, wherein the aircraft is airborne.

10. The aircraft of claim 9, wherein the fixed wing system comprises retractable wings.

11. The aircraft of claim 1, wherein the lift system comprises:
a propeller connected to a propulsion system.

12. The aircraft of claim 1, wherein the lift system comprises:
a number of control surfaces capable of controlling a movement of the aircraft.

13. The aircraft of claim 12, wherein the number of control surfaces are capable of controlling the movement of the aircraft in the air and under the body of water.

14. The aircraft of claim 1, wherein the aircraft is capable of diving into the body of water from the air.

15. A method for operating an aircraft, the method comprising:
storing pressurized gas in a vessel in the aircraft, wherein the pressurized gas is under a first pressure such that the pressurized gas has a first density that allows the aircraft to become submerged under a body of water and to exit the body of water in response to the pressurized gas exiting an orifice of a nozzle in the fuselage, wherein the first density is around one gram per cubic centimeter, and wherein the vessel is pressurized to a second pressure of around 600 atmospheres to around 700 atmospheres, wherein the orifice of the nozzle has a diameter to provide a force created by a release of the pressurized gas through the orifice of the nozzle;
providing different sections of the aircraft having different densities relative to a second density of a water;
providing a ballast system in the fuselage capable of allowing the second pressure of the vessel to equal a third pressure at a depth at which the aircraft is located; and
providing a lift system to provide lift to the aircraft in the air so that the aircraft takes off into the air from under the body of water in response to the force.

16. The method of claim 15, further comprising:
sending a nitrogen gas from the vessel to a fuel system in the aircraft to create an inert environment for the fuel system.

17. The method of claim 15, further comprising:
sending an amount of oxygen from the vessel to a crew compartment and to a propulsion system in the vehicle.

18. The method of claim 15 further comprising:
providing a crew compartment in the fuselage having a third density less than the second density; and
providing a fuel system in the fuselage having substantially the second density.

* * * * *